United States Patent
Jeong

(10) Patent No.: US 11,332,185 B2
(45) Date of Patent: May 17, 2022

(54) VEHICLE STEERING ELECTRONIC CONTROL SENSOR APPARATUS, POWER SUPPLY APPARATUS, AND STEERING APPARATUS FOR VEHICLE

(71) Applicant: MANDO CORPORATION, Gyeonggi-do (KR)

(72) Inventor: SunHee Jeong, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 791 days.

(21) Appl. No.: 16/175,836

(22) Filed: Oct. 31, 2018

(65) Prior Publication Data
US 2019/0135336 A1    May 9, 2019

(30) Foreign Application Priority Data
Nov. 3, 2017 (KR) .................... 10-2017-0146186

(51) Int. Cl.
B62D 5/04 (2006.01)
B60W 50/00 (2006.01)
B62D 5/18 (2006.01)

(52) U.S. Cl.
CPC ........... B62D 5/0475 (2013.01); B60W 50/00 (2013.01); B62D 5/046 (2013.01); B62D 5/049 (2013.01);
(Continued)

(58) Field of Classification Search
CPC .... B62D 5/0457; B62D 5/046; B62D 5/0463; B62D 5/0475; B62D 5/0481;
(Continued)

(56) References Cited

U.S. PATENT DOCUMENTS 10,584,953 B2 * 3/2020 Furukawa ................ G01D 5/12
2010/0244558 A1 * 9/2010 Mitsutani ............... B60K 6/365
307/9.1
(Continued)

FOREIGN PATENT DOCUMENTS

CN        104015787        9/2014
CN        106945720        7/2017
(Continued)

OTHER PUBLICATIONS

Office Action dated Jan. 3, 2019 for Korean Patent Application No. 10-2017-0146186 and its English machine translation by Google Translate.
(Continued)

*Primary Examiner* — Kevin Hurley
*Assistant Examiner* — Maurice L Williams
(74) *Attorney, Agent, or Firm* — Ladas & Parry, LLP

(57) ABSTRACT

An apparatus for controlling a motor included in a vehicle may comprise a main regulator configured to supply a source voltage, a plurality of sub-regulators connected to the main regulator, each of the sub-regulators configured to convert the source voltage to a respective sub-voltage, a passive component connected to the main regulator, and a plurality of sensors comprising first sensors and a second sensor, each of the first sensors connected to a corresponding sub-regulator of the sub-regulators, the second sensor connected to the main regulator through the passive component.

8 Claims, 13 Drawing Sheets

(52) U.S. Cl.
CPC ......... *B62D 5/0463* (2013.01); *B62D 5/0481* (2013.01); *B62D 5/0484* (2013.01); *B62D 5/18* (2013.01)

(58) Field of Classification Search
CPC ........ B62D 5/0484; B62D 5/049; B62D 5/18; B60W 50/00; B60W 50/023
See application file for complete search history.

(56) References Cited

U.S. PATENT DOCUMENTS

| | | | | |
|---|---|---|---|---|
| 2014/0177117 | A1* | 6/2014 | Curtis | H02H 3/162 |
| | | | | 361/93.1 |
| 2017/0029016 | A1* | 2/2017 | Kozawa | G01L 25/00 |
| 2017/0029021 | A1* | 2/2017 | Lee | G05D 1/0088 |
| 2018/0215409 | A1* | 8/2018 | Pramod | H02P 21/13 |
| 2018/0234039 | A1* | 8/2018 | Kuwahara | H02P 6/16 |
| 2018/0362071 | A1* | 12/2018 | Zuzelski | B62D 5/0481 |
| 2019/0031235 | A1* | 1/2019 | Lee | B62D 5/006 |
| 2019/0043276 | A1* | 2/2019 | Conell | F02N 11/108 |
| 2019/0043794 | A1* | 2/2019 | Kapusta | H01L 23/49811 |
| 2019/0054952 | A1* | 2/2019 | Sasaki | B62D 5/0421 |
| 2019/0100237 | A1* | 4/2019 | Klesing | B62D 5/0484 |
| 2019/0135336 | A1* | 5/2019 | Jeong | B62D 5/0475 |
| 2019/0300009 | A1* | 10/2019 | Sakamoto | B60W 50/0225 |

FOREIGN PATENT DOCUMENTS

| | | |
|---|---|---|
| JP | 2017-191092 | 10/2017 |
| KR | 10-2015-0027911 | 3/2015 |

OTHER PUBLICATIONS

Office Action dated Jan. 26, 2022 for Chinese Patent Application No. 201811308996,7 and its English translation from Google Translate.

* cited by examiner

VEHICLE STEERING ELECTRONIC CONTROL SENSOR APPARATUS, POWER SUPPLY APPARATUS, AND STEERING APPARATUS FOR VEHICLE

CROSS REFERENCE TO RELATED APPLICATION

This application claims priority to Korean Patent Application No. 10-2017-0146186, filed on Nov. 3, 2017, which are hereby incorporated by reference for all purposes as if fully set forth herein.

BACKGROUND

1. Technical Field

Some embodiments of the present disclosure relate to a sensor system or assembly, and more specifically, to a vehicle steering electronic control sensor apparatus, a power supply apparatus, and a steering apparatus for a vehicle.

2. Description of Related Art

Generally, a sensor system may mean a system which processes one or more sensor or sensing signals measured or generated by one or more sensors and uses the processed sensor or sensing signals. In recent years, the number of sensors applied to such a sensor system has been rapidly increased. Therefore, redundancy as well as a demand for reliability have increased with respect to a sensor or sensing signal.

In particular, as autonomous navigation technology is applied to vehicles, the sensor system is emerging as important technology for a steering apparatus for a vehicle.

A steering system may mean a system in which a vehicle driver may change a steering angle of a vehicle wheel based on steering force (or a rotational force) applied to a steering wheel. Recently, an electric power steer (EPS), i.e., an electric power steering system, has been applied to a vehicle in order to reduce the steering force of the steering wheel to ensure the stability of a steering state.

For example, the electric power steering system may drive a motor by using at least one of sensor signals generated by sensors mounted in the vehicle to provide light and comfortable steering sense to the vehicle driver during low speed driving, to provide a heavy and safe steering sense to the vehicle driver during high speed driving, and to allow the vehicle driver to rapidly steer the vehicle in an emergency, thereby providing an optimum steering state.

As described above, the electric power steering system drives the motor by using the sensor or sensing signals generated by the sensors mounted in the vehicle. Therefore, redundancy and a demand for reliability of a sensor signal have been increased with respect to a steering apparatus for a vehicle.

In addition, redundancy and reliability of the sensor signal as well as redundancy and a demand for reliability of power supplied to the sensor have been increased with respect to the steering apparatus for the vehicle.

It is with respect to these and other general considerations that the following embodiments have been described. Also, although relatively specific problems have been discussed, it should be understood that the embodiments should not be limited to solving the specific problems identified in the background.

SUMMARY

According various embodiments of the present disclosure, a vehicle steering electronic control sensor apparatus may be capable of improving redundancy and reliability of power supplied to a sensor. According to certain embodiments of the present disclosure, a power supply apparatus may be capable of improving redundancy and reliability of power supplied to a sensor.

According to some embodiments of the present disclosure, a steering apparatus for a vehicle may be capable of improving redundancy and reliability of power supplied to a sensor.

According to various embodiments of the present disclosure, an apparatus for controlling a motor included in a vehicle may comprise: a main regulator configured to supply a source voltage; a plurality of sub-regulators connected to the main regulator, each of the sub-regulators configured to convert the source voltage to a respective sub-voltage; a passive component connected to the main regulator; and a plurality of sensors comprising first sensors and a second sensor, each of the first sensors connected to a corresponding sub-regulator of the sub-regulators, the second sensor connected to the main regulator through the passive component.

According to some embodiments of the present disclosure, a vehicle steering electronic control sensor apparatus may include: a first power converter configured to convert an input voltage into a first voltage; a second power converter configured to convert the first voltage into respective sub-voltages through at least two sub-power converters; and a sensor module operated by receiving the respective sub-voltages through at least two sensors.

According to certain embodiments of the present disclosure, a power supply apparatus may include: a first power converter configured to convert an input voltage into a first voltage; and a second power converter configured to convert the first voltage into respective sub-voltages through at least two sub-power converters and supply the respective sub-voltages to respective sensors.

According to some embodiments of the present disclosure, a steering apparatus for a vehicle may control the operation of a steering motor through at least one steering control module. At least one steering control module may include a power supply unit configured to convert an input voltage into a first voltage, convert the first voltage into respective sub-voltages through at least two sub-power converters, and supply the respective sub-voltages; a motor position sensor unit including at least two motor position sensors or at least two motor angle sensors operated by receiving the respective sub-voltages; and a control unit configured to generate an assist steering force based on respective motor position sensor signals or respective motor angle sensor signals received from the at least two motor position sensors or the at least two motor angle sensors and configured to control the operation of the steering motor based on the assist steering force.

According to various exemplary embodiments of the present disclosure, a power supply apparatus may comprise: a power converter configured to convert an input voltage into a first voltage; and sub-power converters configured to convert the first voltage into a plurality of sub-voltages, each of the sub-power converters supplying at least one corresponding sensor. The sub-power converters may include a first sub-power converter configured to convert the first voltage into a first sub-voltage and a second sub-power converter configured to convert the first voltage into a second sub-voltage. At least one corresponding sensor may include a first sensor operated by receiving the first sub-voltage and a second sensor operated by receiving the second sub-voltage. The sub-power converters may further include a third sub-power converter configured to convert the first voltage into a third-sub voltage. At least one corresponding sensor further may include a third sensor operated by receiving the third sub-voltage.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
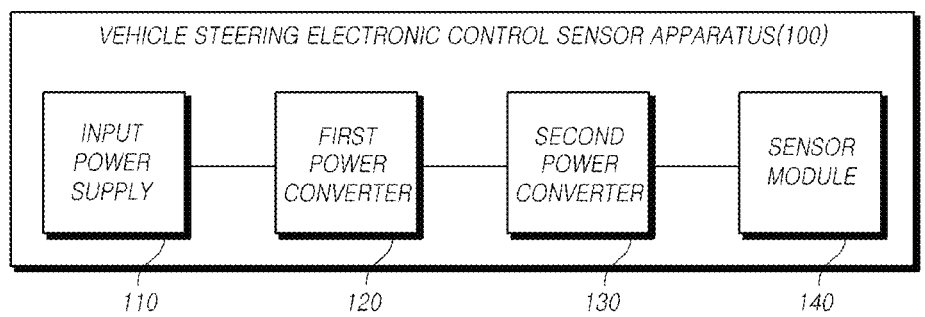
FIG. 1 shows an overall block diagram of a vehicle steering electronic control sensor apparatus according to an embodiment of the present disclosure.

The advantages, features, and schemes of achieving the advantages and features of the present embodiments will be made apparent to and comprehended by those skilled in the art based on the embodiments, which will be described below in detail, together with accompanying drawings. The present embodiments are not limited to the following embodiments but include various applications and modifications. The present embodiments will complete the disclosure of the present invention and allow those skilled in the art to completely comprehend the scope of the present invention. The present embodiments are only defined within the scope of accompanying claims. Like components will be denoted by like reference numerals throughout the specification. The terminology "and/or" includes any and all combinations of one or more of the associated listed items.

Although the terms "first," "second," etc. may be used herein to describe various components, elements, and/or sections, it will be understood that the components, elements, and/or sections should not be limited to the terms. These terms are only used to distinguish one component, element, or section from another. For example, a first component, a first element, or a first section to be described below could be termed a second component, a second element, or a second section without departing the scope of the present embodiments.

The terminology used herein is for the purpose of describing embodiments only and is not intended to be limiting of the present embodiments. As used herein, the singular forms "a", "an," and "the" are intended to include the plural forms as well, unless the context clearly indicates otherwise. It will be further understood that the terms "comprises," "comprising," "includes," and/or "including," if used herein, specify the presence of stated steps, operations, elements and/or components, but do not preclude the presence or addition of one or more other steps, operations, elements, components and/or groups thereof.

Unless otherwise defined, all terms (including technical and scientific terms) used in the present specification may be used as the same meaning which may be commonly understood by the person with ordinary skill in the art, to which the present invention belongs. It will be further understood that terms defined in commonly used dictionaries should not be interpreted in an idealized or excessive sense unless expressly and specifically defined.

In the following description of the embodiments of the present embodiments, a detailed description of known functions or configurations will be omitted to avoid unnecessarily obscuring the subject matter of the present embodiments. Furthermore, the terms used herein are defined by taking functions of the embodiments of the present embodiments into account and can be changed according to the custom or intention of users or operators. Therefore, the meanings of terms should be interpreted based on the scope throughout this specification.

Hereinafter, a vehicle steering electronic control sensor apparatus according to the present embodiments will be described with reference to the accompanying drawings.

A vehicle steering electronic control sensor apparatus 100 according to various embodiments of the present disclosure may include one or more of a first power converter 120, a second power converter 130 and a sensing module 140. The first power converter 120 may be configured to convert an input voltage into a first voltage. The second power converter 130 may be configured to convert the first voltage into the plurality of sub-voltages through or by the plurality of sub-power converters. The sensing or sensor module 140 may be operated by receiving the respective sub-voltages through at least two sensors.

The first power converter 120 may convert the input voltage, for example, but not limited to, a direct current (DC) voltage, to the first voltage. The first voltage may be lower than a corresponding DC voltage. The second power convertor 130 may comprise the plurality of sub-power converters. The second power converter 130 may convert the first voltage into the plurality of sub-voltages through at least two sub-power converters. The sub-voltages may be lower than the first voltage. The For example, the second power converter 130 may include a first sub-power converter and a second sub-power coverter. The first sub-power converter may be configured to convert the first voltage into a first sub-voltage. The second sub-power converter may be configured to convert the first voltage into a second sub-voltage. The sensor module 140 may include a first sensor and a second sensor. The first sensor may be operated by receiving the first sub-voltage and the second sensor may be operated by receiving the second sub-voltage.

For instance, the first power converter 120 may comprise or be a regulator (or main regulator), the first sub-power converter may comprise or be a sub-regulator, and the second sub-power converter may comprise or be at least one passive component, for example, but not limited to, a resistor. The regulator (or main regulator) may be, for example, but not limited to, a device capable of supplying a voltage necessary (or suitable) for operations of integrated circuits (ICs). For, the regulator (or main regulator) may be a device capable of supplying a constant operating voltage (or a constant power voltage) required by the ICs (e.g., the IC inside an electronic control unit (ECU)) when an irregular input voltage or a high input voltage is applied. The sub-regulators may be, for example, but not limited to, devices capable of receiving a voltage pre-regulated by the main regulator and outputting a constant voltage. The sub-regulators may have a relatively simple structure compared to the main regulator. For instance, voltages supplied to the ICs (e.g., ICs inside the ECU) may be provided separately using the sub-regulators The sub-regulator may convert the first voltage into the first sub-voltage through the sub-regulator. The second sub-power converter may convert the first voltage into the second sub-voltage through at least one resistor.

In this case, the first sub-voltage and the second sub-voltage may have the same voltage value, although it is not required. The first sub-voltage and the second sub-voltage may be different from each other.

The first sensor and the second sensor may be included in a dual die.

The second power converter 130 may further include a third sub-power converter. The third sub-power converter may be configured to convert the first voltage into a third sub-voltage. The sensor module 140 may further include a third sensor. The third sensor may be operated by receiving the third sub-voltage.

Here, the third sub-power converter may comprise or be a sub-regulator. The third sub-power converter may convert the first voltage into the third sub-voltage through the sub-regulator.

In this case, the first to third sub-voltages may have the same voltage value, although it is not required. At least one of the first to third sub-voltages may be different from the others.

Here, the second sensor may be included in a single die.

In this case, at least two sensors may include a motor position sensor. The motor position sensor may configured to sense the position or angle of the motor. The motor position sensor may be, for example, but not limited to, a device to detect or sense the position or angle (e.g. angular position, angular movement, rotational position, and rotational movement) of a rotor or shaft. For instance, the motor position sensors may include an angle sensor, a rotary sensor, an angle position sensor, an angular position sensor, a rotary position sensor. Furthermore, the motor position sensors may include at least one of a hall-effect, a magneto-resistive, resolver, optical, and inductive sensors.

FIG. 1 shows an overall block diagram of a vehicle steering electronic control sensor apparatus according to an embodiment of the present disclosure.

Referring to FIG. 1, a vehicle steering electronic control sensor apparatus 100 may include one or more of a first power converter 120, a second power converter 130, a sensing or sensor module 140, and the like. The vehicle steering electronic control sensor apparatus 100 may further include an input power supply 110 and the like.

The input power supply 110 may include at least one power supply of a DC power supply and an alternating current (AC) power supply. The DC power supply may be, for example, but not limited to, a battery power supply. The DC power supply may include any power supply that may supply the DC. The input power supply 110 may supply an input voltage. For instance, the input voltage may be a DC voltage.

The first power converter 120 may be connected to the input power supply 110. The first power converter 120 may receive the input voltage from the input power supply 110. The first power converter 120 may convert the input voltage received from the input power supply 110 into the first voltage. For example, the first power converter 120 may convert a DC voltage received from the DC power supply into the first voltage.

Here, the first voltage may be a voltage which is lower than the input voltage. For example, the first power converter 120 may convert the DC voltage, received from the DC power supply, into the first voltage, which is lower than the DC voltage.

In addition, the first power converter 120 may include a DC-to-DC converter. The DC-to-DC converter may include, for example, but not limited to, a buck converter. The DC-to-DC converter may include any converter that may receive a DC voltage and may convert the received DC voltage into a DC voltage which is lower than the received DC voltage In addition, the first power converter 120 may include or be a main regulator. Here, the main regulator may receive a DC voltage and may convert the received DC voltage into a DC voltage which is lower than the received DC voltage.

The second power converter 130 may include at least two sub-power converters. In addition, the second power converter 130 may convert the first voltage into the plurality of sub-voltages through at least two sub-power converters.

For example, at least two sub-power converters may be connected to the first power converter 120. Each of at least two sub-power converters may receive the first voltage from the first power converter 120. Each of at least two sub-power converters may convert the first voltage, received from the first power converter 120, into respective sub-voltages.

Here, the sub-voltages may each be a voltage which is lower than the first voltage, although it is not required. For example, each of at least two sub-power converters may convert the first voltage (for example, a DC voltage), received from the first power converter 120, into respective sub-voltages which are lower than the first voltage.

Here, the sub-voltages may have the same voltage value, although it is not required.

In addition, at least one of the sub-power converters may include a DC-to-DC converter. Here, the DC-to-DC converter may include, for example, but not limited to, a buck converter. The DC-to-DC converter may include any converter that may receive a DC voltage and may convert the received DC voltage into a DC voltage which is lower than the received DC voltage.

At least one of the sub-power converters may include or be a sub-regulator. For instance, the sub-regulator may receive a first DC voltage and may convert the received first DC voltage into a second DC voltage which is lower than the received first DC voltage.

In addition, at least one of the sub-power converters may include at least one resistor. The resistor may receive a first DC voltage and may convert the received first DC voltage into a third DC voltage which is lower than the received first DC voltage. The third DC voltage may be the same as the second DC voltage, although it is not required.

The sensing or sensor module 140 may include the plurality of sensors. The sensor module 140 may be operated by receiving the respective sub-voltages from the sub-power converters.

The plurality of sensors of the sensing module 140 may be connected to the second power converter 130. For example, at least two sensors may be connected to the sub-power converters of the second power converter 130. Each of the plurality of sensors may receive the respective sub-voltages from the sub-power converters 120. Each of sensors may be operated by receiving the respective sub-voltages from the sub-power converters.

In addition, at least two sensors may include a motor position sensor and/or a motor angle sensor, although it is not required. For example, the sensors may include at least one of a position sensor (for example, a motor position sensor or a motor angle sensor), a speed sensor (for example, a vehicle speed sensor), a torque sensor, an angle sensor (for example, a steering angle sensor), an illumination sensor, a rain sensor, a snowfall sensor, a camera sensor, a radar sensor, a lidar sensor, a pressure sensor, a hall sensor, and a flow rate sensor, but the present invention is not limited thereto. The sensors may include any sensor that may sense a physical quantity or a change in physical quantity.

In addition, the sensors of the sensing module 140 may be the same sensor. However, at least one of the sensors may be different from each other.

According to some embodiments of the present disclosure, in a vehicle steering electronic control sensor apparatus, an input voltage is converted into a first voltage, the first voltage is converted into sub-voltages and each sub-voltage is supplied to corresponding sensors so that power supplied to the plurality of sensors may be separated, thereby improving redundancy and reliability of the power supplied to the sensors.

Figure 2:
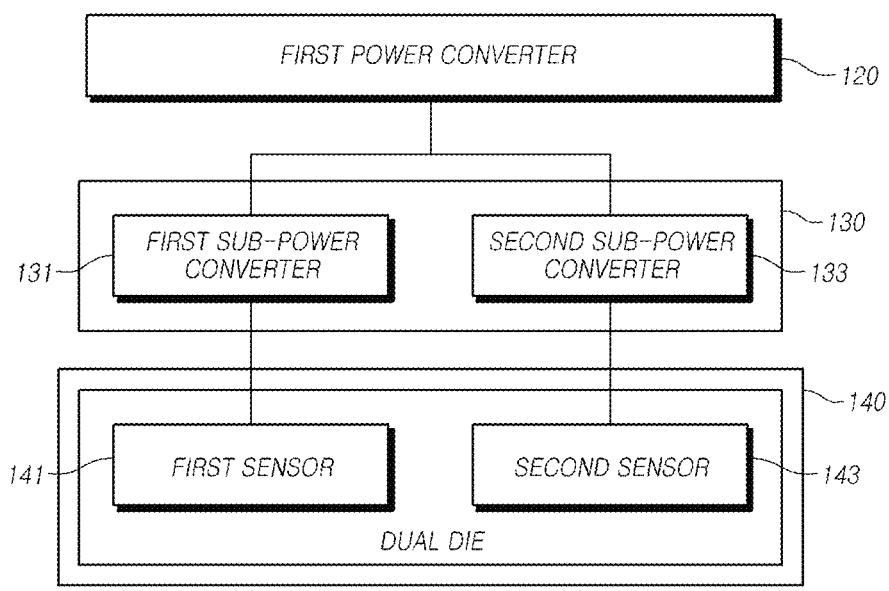
FIG. 2 shows a detailed block diagram of a vehicle steering electronic control sensor apparatus including two sub-power converters and two sensors according to an embodiment of the present disclosure.

FIG. 2 shows a detailed block diagram of a vehicle steering electronic control sensor apparatus including two sub-power converters and two sensors according to an embodiment of the present disclosure.

Referring to FIG. 2, the vehicle steering electronic control sensor apparatus 100 according to the present embodiment may include a second power converter 130, a sensing or sensor module 140, and the like. For example, the second power converter 130 may include a first sub-power converter 131 and a second sub-power converter 133. The sensor module 140 may include a first sensor 141 and a second sensor 143.

The first sub-power converter 131 may be connected to the first power converter 120. The first sub-power converter 131 may receive a first voltage from the first power converter 120. The first sub-power converter 131 may convert the first voltage, received from the first power converter 120, into a first sub-voltage.

For instance, the first sub-power converter 131 may include or be a first sub-regulator. The first sub-regulator may convert the first voltage, received from the first power converter 120, into the first sub-voltage.

The second sub-power converter 133 may be connected to the first power converter 120. The second sub-power converter 133 may receive the first voltage from the first power converter 120. The second sub-power converter 133 may convert the first voltage, received from the first power converter 120, into a second sub-voltage.

For example, the second sub-power converter 133 may include or be at least one resistor. The resistor may convert the first voltage, received from the first power converter 120, into the second sub-voltage.

In addition, at least one resistor may include or be, for example, but not limited to, a high power chip resistor in consideration of a ground (GND) short, a temperature, and the like, but the present invention is not limited thereto. The resistor may be any resistor that may convert a voltage into a sub-voltage.

Here, the first sub-voltage, output from the first sub-power converter 131, and the second sub-voltage, output from the second sub-power converter 133, may have the same voltage value, although it is not required. The first sub-voltage may be different from the second sub-voltage.

The first sensor 141 may be connected to the first sub-power converter 131. The first sensor 141 may receive the first sub-voltage from the first sub-power converter 131. The first sensor 141 may be operated by the first voltage received from the first power converter 131. That is, the first sub-voltage may be an operating voltage of the first sensor 141.

The second sensor 143 may be connected to the second sub-power converter 133. The second sensor 143 may receive the second sub-voltage from the second sub-power converter 133. The second sensor 143 may be operated by the second sub-voltage received from the second sub-power converter 133. That is, the second sub-voltage may be an operating voltage of the second sensor 143.

In an exemplary embodiment, the first sensor 141 and the second sensor 143 may be included in a dual die, although it is not required. Alternatively, each of the first sensor 141 and the second sensor 143 may be included in a single die.

According to certain embodiments of the present disclosure, since a sub-voltage can be generated through a resistor and be supplied to a motor position sensor (e.g. a motor angle sensor), a voltage supplied to a main regulator may be supplied to the motor position sensor through a passive element, thereby reducing manufacturing costs of the vehicle steering electronic control sensor apparatus as well as costs of a steering apparatus for a vehicle.

Figure 3:
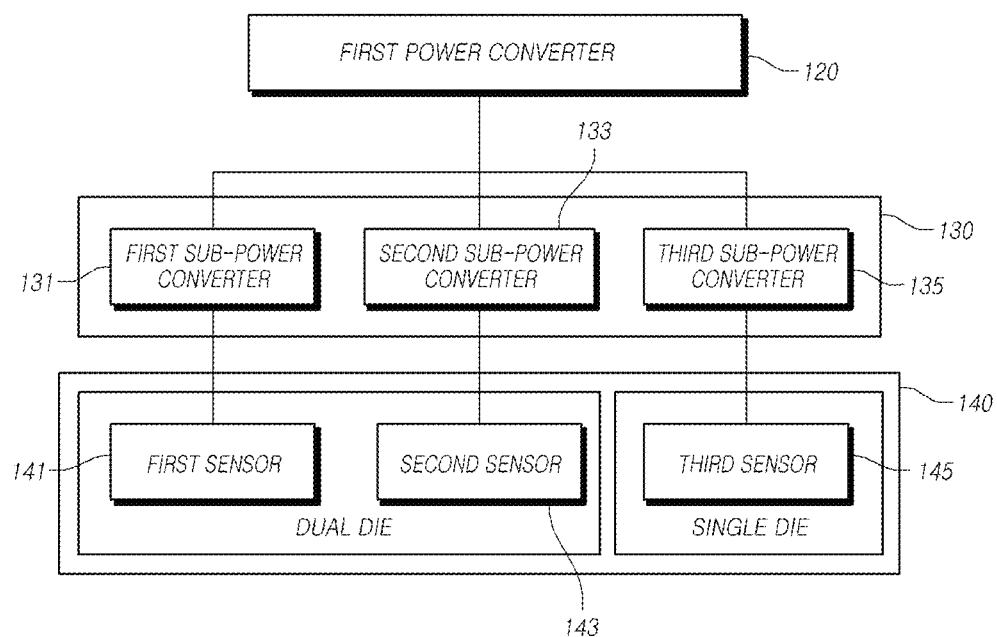
FIG. 3 shows a detailed block diagram of a vehicle steering electronic control sensor apparatus including three sub-power converters and three sensors according to an embodiment of the present disclosure.

FIG. 3 shows a detailed block diagram of a vehicle steering electronic control sensor apparatus including three sub-power converters and three sensors according to another embodiment of the present disclosure.

Referring to FIG. 3, a vehicle steering electronic control sensor apparatus 100 according to the present embodiment may include a second power converter 130, a sensor module 140, and the like. For instance, the second power converter 130 may include a first sub-power converter 131, a second sub-power converter 133, and a third sub-power converter 135. The sensor module 140 may include a first sensor 141, a second sensor 143, and a third sensor 145.

Since the first sub-power converter 131 and the second sub-power converter 133 are described above with reference to FIG. 2, the third sub-power converter 135 will be described below for simplicity of description.

The third sub-power converter 135 may be connected to the first power converter 120. The third sub-power converter 135 may receive the first voltage from the first power converter 120. The third sub-power converter 135 may convert the first voltage, received from the first power converter 120, into a third sub-voltage.

In addition, the third sub-power converter 135 may include or be a second sub-regulator. The second sub-regulator may convert the first voltage, received from the first power converter 120, into the third sub-voltage.

The third sub-voltage output from the third sub-power converter 135 may have the same voltage value as the first sub-voltage, output from the first sub-power converter 131, and the second sub-voltage, output from the second sub-power converter 133. Alternatively, the third sub-voltage output may be different from at least one of the second and third sub-voltages.

Since the first sensor 141 and the second sensor 143 are described above with reference to FIG. 2, the third sensor 145 will be described below for simplicity of description.

The third sensor 145 may be connected to the third sub-power converter 135. The third sensor 145 may receive the third sub-voltage from the third sub-power converter 135. The third sensor 145 may be operated by the third sub-voltage, received from the third sub-power converter 135. That is, the third sub-voltage may be an operating voltage of the third sensor 145.

For example, the third sensor 145 may be included in a single die. In an exemplary embodiment, the first sensor 141 and the second sensor 143 may be included in a dual die, and the third sensor 145 may be included in a single die.

According to some embodiments of the present disclosure, because three motor position sensors (e.g. motor angle sensors) are operated through two regulators and a resistor, the motor position sensors may be operated using voltages of power being separated, thereby improving redundancy and reliability of the vehicle steering electronic control sensor apparatus and a steering apparatus for a vehicle.

Figure 4:
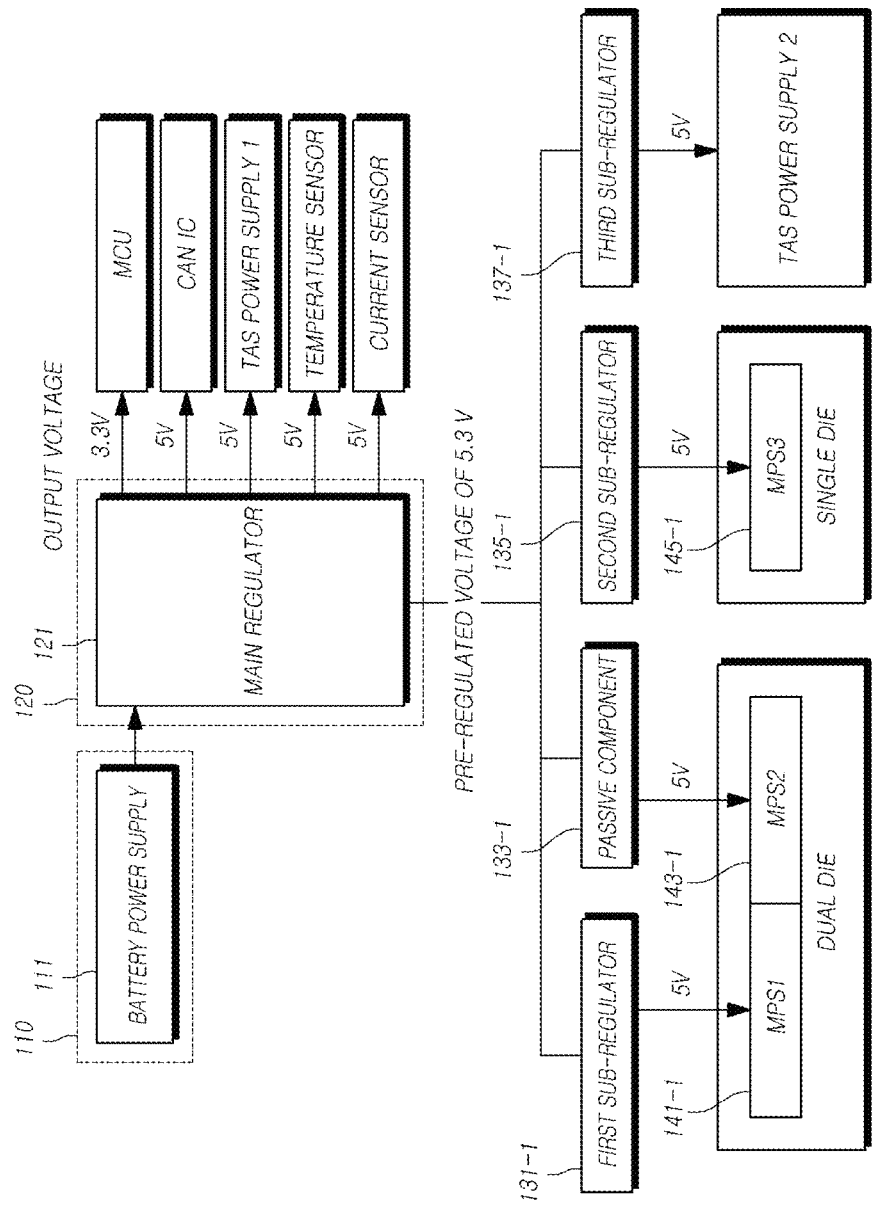
FIG. 4 shows a detailed block diagram of a vehicle steering electronic control sensor apparatus including three sub-power converters and three motor position sensors according to an embodiment of the present disclosure.

FIG. 4 shows a detailed block diagram of a vehicle steering electronic control sensor apparatus including three sub-power converters and three motor position sensors according to still another embodiment of the present disclosure.

Referring to FIG. 4, the input power supply 110 may include or be a battery power supply 111 such as a battery. That is, the battery power supply 111 may supply a DC voltage.

The first power converter 120 may include a main regulator 121. The main regulator 121 may be a device capable of supplying a voltage necessary (suitable) for operations of integrated circuits (ICs). That is, the main regulator 121 may be a device capable of supplying an operating voltage (or a power voltage) required by the ICs (particularly, an IC inside an electronic control unit (ECU)) when an irregular input voltage and a high input voltage are applied.

The main regulator 121 may receive the DC voltage from the battery power supply 111 and may convert the received DC voltage into a plurality of voltages. For example, the main regulator 121 may receive the DC voltage from the battery power supply 111 to output constant power of 5 V and 3.3 V.

As shown in FIG. 4, the main regulator 121 may receive the DC voltage from the battery power supply 111 and may convert the received DC voltage into a pre-regulated voltage and output voltages.

In an exemplary embodiment, the output voltages may be 3.3 V and 5 V. For example, the output voltage of 3.3 V may be supplied to a main control unit (MCU), and the output voltage of 5 V may be supplied to a controller area network (CAN) IC, a TAS (Torque Angle Sensor) power supply 1, a temperature sensor, and a current sensor.

The pre-regulated voltage may be, for example, but not limited to, 5.3 V. In particular, the pre-regulated voltage of 5.3 V may be supplied to a first sub-regulator 131-1, a second sub-regulator 135-1, a third sub-regulator 137-1, and a passive component 133-1.

For instance, the first sub-regulator 131-1 may convert the pre-regulated voltage of 5.3 V into 5 V and may supply the converted voltage of 5 V to a first motor position sensor 141-1 included in a dual die. The passive component 133-1 may convert the pre-regulated voltage of 5.3 V into 5 V and the converted voltage of 5 V may be supplied to a second motor position sensor 143-1 included in the dual die. For example, the passive component 133-1 may be a component that does not require energy to operate or that does not introduce net energy. The passive component 133-1 may include or be, for example, but not limited to, at least one of resistors, capacitors, inductors, and transformers. The second sub-regulator 135-1 may convert the pre-regulated voltage of 5.3 V into 5 V and the converted voltage of 5 V may be supplied to a third motor position sensor 145-1 included in a single die. The third sub-regulator 137-1 may convert the pre-regulated voltage of 5.3 V into 5 V and the converted voltage of 5 V may be supplied to a TAS power supply 2.

For example, the first motor position sensor 141-1 may be a main motor position sensor when the first motor position sensor 141 works properly, and the second motor position sensor 143-1 may be a motor position sensor capable of verifying validity of the first motor position sensor 141-1. However, when the first motor position sensor 141-1 breaks down or malfunctions, the third motor position sensor 145-1 may become the main motor position sensor instead of the first motor position sensor 141-1.

The sub-regulators may be devices capable of receiving a voltage pre-regulated by the main regulator and outputting a constant voltage. Therefore, the sub-regulators may have a relatively simple structure compared to the main regulator. In particular, voltages supplied to the ICs (e.g., ICs inside the ECU) may be provided separately using the sub-regulators in a vehicle steering electronic control sensor apparatus.

Hereinafter, a steering apparatus for a vehicle according to the present embodiments will be described with reference to the accompanying drawings.

A steering apparatus 200 for a vehicle according to some embodiments of the present disclosure may include a power supply 210, the plurality of motor position sensors 220 (e.g. motor angle sensors), a controller 230 and a steering motor 240. The power supply 210 may be configured to convert an input voltage into a first voltage, convert the first voltage into sub-voltages through at least two sub-power converters, and supply the respective sub-voltages. The motor position sensors 220 may be operated by receiving the respective sub-voltages. The controller 230 may be configured to generate assist steering force based on motor position sensor signals (e.g., motor angle sensor signals), received from the motor position sensors 220. The operation of steering motor 240 may be controlled based on the assist steering force.

In an exemplary embodiment, the power supply 210 may include a first power converter, a first sub-power converter and a second sub-power converter. The first power converter may be configured to convert the input voltage to the first voltage. The first sub-power converter may be configured to convert the first voltage to a first sub-voltage. The second sub-power converter may be configured to convert the first voltage to a second sub-voltage. The motor position sensors (e.g., motor angle sensors) may include a first motor position sensor (e.g., a first motor angle sensor) and a second motor position sensor (e.g. a second motor angle sensor). The first motor position sensor may be configured to receive the first sub-voltage to measure a position of the steering motor and to generate a first motor position sensor signal (or a first motor angle sensor signal). The second motor position sensor (e.g., a second motor angle sensor) may be configured to receive the second sub-voltage to measure the position of the steering motor and to generate a second motor position sensor signal (or a second motor angle sensor signal).

The first sub-power converter may convert the first voltage to a first sub-voltage through a regulator. The second sub-power converter may convert the first voltage to the second sub-voltage through at least one resistor.

For example, the first motor position sensor (or the first motor angle sensor) and the second motor position sensor (or the second motor angle sensor) may be included in a dual die.

The power supply 210 may further include a third sub-power converter configured to convert the first voltage to a third sub-voltage. The motor position sensors (e.g., motor angle sensors) may further include a third motor position sensor (or a third motor angle sensor) configured to receive the third sub-voltage to measure the position of the steering motor and to generate a third motor position sensor signal (or a third motor angle sensor signal).

The third sub-power converter may convert the first voltage into the third sub-voltage through a regulator.

For instance, the third motor position sensor (or the third motor angle sensor) may be included in a single die.

The controller may perform validity verification on motor position sensor signals (or motor angle sensor signals) received from the motor position sensors (or the motor angle sensors) and may generate assist steering force according to verification results.

Figure 5:
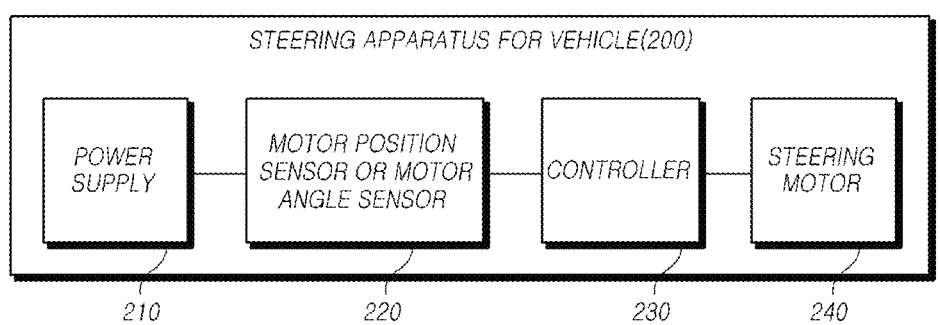
FIG. 5 shows an overall block diagram of a steering apparatus for a vehicle according to an embodiment of the present disclosure.

FIG. 5 shows an overall block diagram of a steering apparatus for a vehicle according to an embodiment of the present disclosure.

Referring to FIG. 5, a steering apparatus 200 for a vehicle may include a power supply 210, the plurality of motor position sensors (or motor angle sensors) 220, a controller 230, and the like. The steering apparatus 200 for the vehicle may further include a steering motor 240.

According to some exemplary embodiments, the power supply 210 of FIG. 5 may include the input power supply 110, the first power converter 120, and the second power converter 130 described with reference to FIGS. 1 to 4. overlapping portions will be omitted below for simplicity of description.

The power supply 210 may convert an input voltage into a first voltage, may convert the converted first voltage into the plurality of sub-voltages through the plurality of sub-power converters, and may supply the converted sub-voltages to the plurality of motor position sensors 220.

In addition, the power supply 210 may include a first power converter 120, a first sub-power converter 131, a second sub-power converter 133, a third sub-power converter 135, and the like.

The first power converter 120 may convert the input voltage to the first voltage. The first power converter 120 may include or be a main regulator. For example, the first power converter 120 may convert the input voltage into the first voltage through the main regulator.

The first sub-power converter 131 may convert the first voltage to a first sub-voltage. The first sub-power converter 131 may include or be a first sub-regulator. For example, the first sub-power converter 131 may convert the first voltage into the first sub-voltage through the first sub-regulator.

The second sub-power converter 133 may convert the first voltage to a second sub-voltage. The second sub-power converter 133 may include or be at least one resistor. For example, the second sub-power converter 133 may convert the first voltage into the second sub-voltage through at least one resistor.

The third sub-power converter 135 may convert the first voltage to a third sub-voltage. The third sub-power converter 135 may include a second sub-regulator. For instance, the third sub-power converter 135 may convert the first voltage into the third sub-voltage through the second sub-regulator.

The steering apparatus for the vehicle 200 may further comprise at least two motor position sensors (e.g. motor angle sensors) 220. The motor position sensors 220 may be operated by receiving respective sub-voltages from the power supply 210. Each of the sub-voltages may be an operating voltage of the motor position sensor 220.

In addition, the plurality of motor position sensors 220 may include a first motor position sensor, a second motor position sensor, a third motor position sensor, and the like.

Furthermore, the plurality of motor angle sensors 220 may include a first motor angle sensor, a second motor angle sensor, a third motor angle sensor, and the like.

The first motor position sensor or the first motor angle sensor may receive the first sub-voltage from the first sub-power converter 131 of the power supply 210 to measure a position of a steering motor 240 and to generate a first motor position sensor signal or a first motor angle sensor signal.

The second motor position sensor or the second motor angle sensor may receive the second sub-voltage from the second sub-power converter 133 of the power supply 210 to measure the position of the steering motor 240 and to generate a second motor position sensor signal or a second motor angle sensor signal.

The third motor position sensor or the third motor angle sensor may receive the third sub-voltage from the third sub-power converter 135 of the power supply 210 to measure the position of the steering motor 240 and to generate a third motor position sensor signal or a third motor angle sensor signal.

For example, the first motor position sensor and the second motor position sensor, or the first motor angle sensor and the second motor angle sensor, may be included in a dual die. The third motor position sensor or the third motor angle sensor may be included in a single die.

The controller 230 may receive respective motor position sensor signals or respective motor angle sensor signals from the motor position sensors or motor angle sensors 220. The controller 230 may generate or calculate assist steering force based on the motor position sensor signals or the motor angle sensor signals received from the motor position sensors or the motor angle sensors.

In addition, the controller 230 may perform validity verification on the respective motor position sensor signals or the respective motor angle sensor signals received from the motor position sensors or the motor angle sensors 220 and may generate or calculate assist steering force according to verification results.

In an example, when the first and second motor position sensor signals or the first and second motor angle sensor signals are provided to the controller 230 from the first and second motor position sensors or the first and second motor angle sensors 220, the controller 230 may perform validity verification on each of the first and second motor position sensor signals or the first and second motor angle sensor signals. For example, the controller 230 may compare each of the first and second motor position sensor signals or the first and second motor angle sensor signals with each of preset normal ranges. When each of the sensor signals is within each of the preset normal ranges, the controller 230 may determine that the first and second motor position sensor signals or the first and second motor angle sensor signals are normal.

When the first motor position sensor signal or the first motor angle sensor signal is set as a main motor position sensor signal or a main motor angle sensor signal, the controller 230 may compare the first motor position sensor signal with the second motor position sensor signal or may compare the first motor angle sensor signal with the second motor angle sensor signal, may perform validity verification on the first motor position sensor signal or the first motor angle sensor signal, and may generate or calculate assist steering force according to the verification result. For instance, the controller 230 may compare the first motor position sensor signal with the second motor position sensor signal or may compare the first motor angle sensor signal with the second motor angle sensor signal. When a difference value between the first motor position/angle sensor signal with the second motor position/angle sensor signal is within a preset normal range, the controller 230 may determine that the first motor position sensor signal or the first motor angle sensor signal is normal. Thus, the controller 230 may generate or calculate the assist steering force based on or by using the first motor position sensor signal or the first motor angle sensor signal.

In another example, when the first to third motor position sensor signals or the first to third motor angle sensor signals are provided to the controller 230 from the first to third motor position sensors or the first to third motor angle sensors, the controller 230 may perform validity verification on each of the first to third motor position sensor signals or the first to third motor angle sensor signals. For instance, the controller 230 may compare each of the first to third motor position sensor signals or the first to third motor angle sensor signals with each of preset normal ranges. When each of the sensor signals is within each of the preset normal ranges according to the comparison results, the controller 230 may determine that the first to third motor position sensor signals or the first to third motor angle sensor signals are normal.

When the first motor position sensor signal or the first motor angle sensor signal is set as a main motor position sensor signal or a main motor angle sensor signal, the controller 230 may compare the first motor position sensor signal with the second motor position sensor signal or may compare the first motor angle sensor signal with the second motor angle sensor signal, may perform validity verification on the first motor position sensor signal or the first motor angle sensor signal, and may generate or calculate assist steering force according to the verification result.

For instance, the controller 230 may compare the first motor position sensor signal with the second motor position sensor signal or may compare the first motor angle sensor signal with the second motor angle sensor signal. When a difference value between the first motor position/angle sensor signal and the second motor position/angle sensor signal is within a preset normal range, the controller 230 may determine that the first motor position sensor signal or the first motor snarl sensor signal is normal. The controller 230 may generate or calculate the assist steering force by using the first motor position sensor signal or the first motor angle sensor signal.

On the other hand, when a difference value between the first motor position/angle sensor signal and the second motor position/angle sensor signal exceeds or is out of a preset normal range, the controller 230 may determine that the first motor position sensor signal or the first motor angle sensor signal is faulty or abnormal. Thus, the controller 230 may generate or calculate assist steering force by using the third motor position sensor signal or the third motor angle sensor signal instead of the first motor position/angle sensor signal.

The controller 230 may include an inverter, a gate driver, and the like.

The steering motor 240 may be connected to the controller 230. The steering motor 240 may receive the calculated assist steering force from the controller 230. The operation of the steering motor 240 may be performed by using the calculated assist steering force received from the controller 230.

As described above, according to certain embodiment of the present disclosure, in a steering apparatus for a vehicle, an input voltage is converted into a first voltage through a power supply, the first voltage is converted into the plurality of sub-voltages by using the plurality of sub-power converters, respective sub-voltages are supplied to corresponding motor position sensors or motor angle sensors, validity verification is performed on respective motor position sensor signals or respective motor angle sensor signals received from the motor position sensors or motor angle sensors through a controller, assist steering force is generated according to the verification results, and a steering motor is operated based on the assist steering force. Power may be separated to be supplied to the plurality of motor position sensors or motor angler sensors, thereby improving redundancy and reliability of the steering apparatus for the vehicle.

Figure 6:
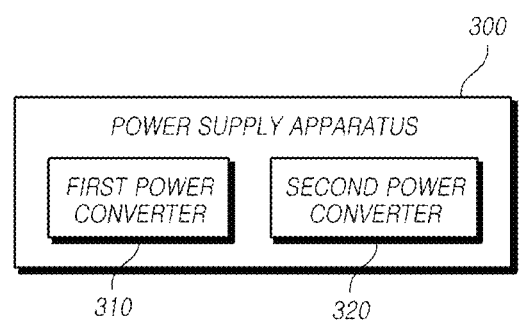
FIG. 6 shows an overall block diagram of a power supply apparatus according to an embodiment of the present disclosure.

FIG. 6 shows an overall block diagram of a power supply apparatus according to an embodiment of the present disclosure.

Referring to FIG. 6, a power supply apparatus 300 according to the present embodiment may include a first power converter 310, a second power converter 320, and the like.

The power supply apparatus 300 of FIG. 6 may include one or more of the input power supply 110, the first power converter 120 and the second power converter 130 described with reference to FIGS. 1 to 5. Further, the power supply apparatus 300 of FIG. 6 may include the power supply 210 described with reference to FIG. 5. The power supply apparatus 300 of FIG. 6 can perform some or all functions of the input power supply 110, the first power converter 120, the second power converter 130, and the power supply 210 described with reference to FIGS. 1 to 5.

The first power converter 310 and the second power converter 320 of the power supply apparatus 300 may be the same elements as the first power converter 120 and the second power converter 130 described with reference to FIGS. 1 to 5.

Hereinafter, for simplicity of description, only a brief function will be described, and FIGS. 1 to 5 may be referred to for a specific function.

The power supply apparatus 300 may include the first power converter 310 and the second power converter 320. The first power converter 310 may be configured to convert an input voltage into a first voltage. The second power converter 320 may be configured to convert the first voltage into the plurality of sub-voltages through the plurality of sub-power converters and supply the sub-voltages to sensors.

The first power converter 310 may convert a DC voltage into the first voltage. The first voltage may be lower than a corresponding DC voltage.

The second power converter 320 may convert the first voltage into the plurality of sub-voltages through the plurality of sub-power converters. The sub-voltage may be lower than the first voltage.

For example, the second power converter 320 may include a first sub-power converter configured to convert the first voltage into a first sub-voltage and a second sub-power converter configured to convert the first voltage into a second sub-voltage.

The sensors may include, for example, but not limited to, a first sensor operated by receiving the first sub-voltage and a second sensor operated by receiving the second sub-voltage.

In an exemplary embodiment, the first sub-power converter may convert the first voltage to the first sub-voltage through a regulator while the second sub-power converter may convert the first voltage to the second sub-voltage through at least one resistor.

The first sub-voltage and the second sub-voltage may have the same voltage value, although it is not required. The first sub-voltage may be different from the second sub-voltage.

The first sensor and the second sensor may be included in a dual die.

In another exemplary embodiment, the second power converter 320 may further include a third sub-power converter configured to convert the first voltage into a third sub-voltage. The sensors may further include a third sensor operated by receiving the third sub-voltage.

The third sub-power converter may convert the first voltage into the third sub-voltage through a regulator.

The first to third sub-voltages may have the same voltage value, although it is not required. At least one of the first to third sub-voltages may be different from each other.

The third sensor may be included in a single die.

The sensors may include, for example, but not limited to, a motor position sensor or a motor angle sensor.

Figure 7:
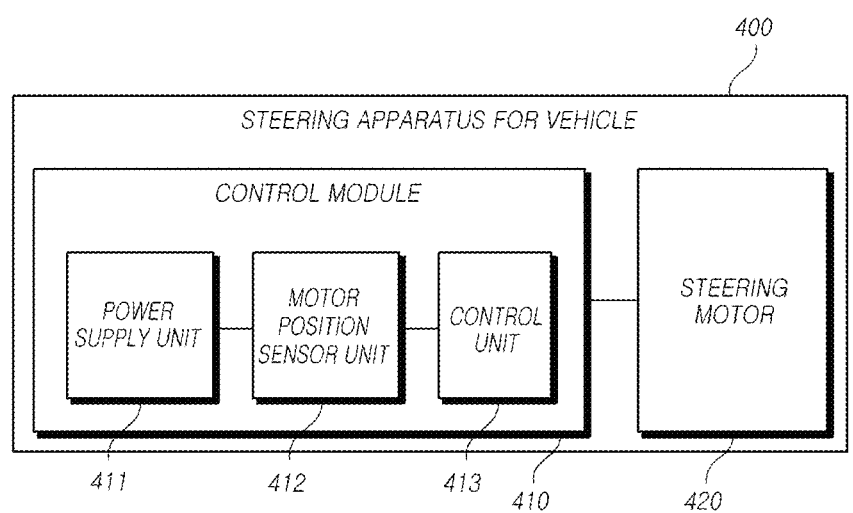
FIGS. 7 and 8 show detailed block diagrams illustrating a steering apparatus for a vehicle according to embodiments of the present disclosure.
Figure 8:
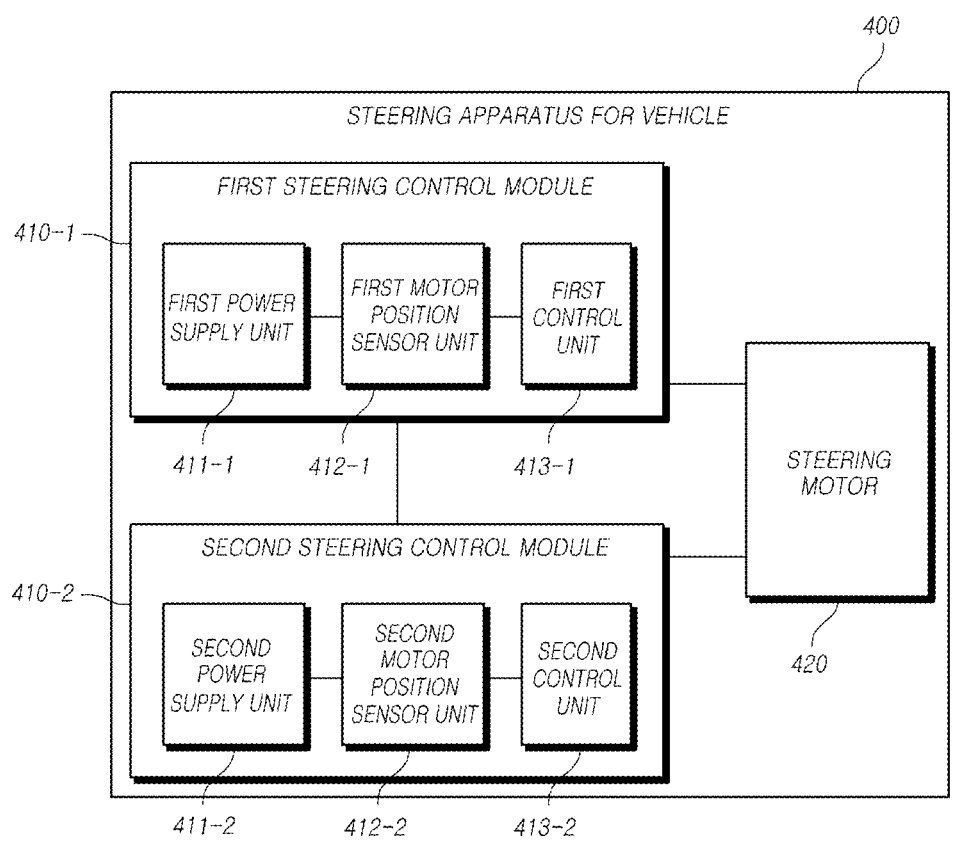

FIGS. 7 and 8 show detailed block diagrams of a steering apparatus for a vehicle according to embodiments of the present disclosure.

Referring to FIG. 7, a steering apparatus 400 for a vehicle may include a steering control module 410 and the like. The steering apparatus 400 for the vehicle according to the present embodiment may further include a steering motor 420 and the like.

Here, the steering control module 410 may perform some or all functions of the vehicle steering electronic control sensor apparatus 100, the power supply 210, the motor position sensor and/or the motor angle sensor 220, the controller 230 of the steering apparatus 200, and the power supply apparatus 300 described with reference to FIGS. 1 to 6.

The steering control module 410 may include a power supply unit 411, a motor position sensor unit 412, a control unit 413, and like. The power supply unit 411 may comprise the same or similar components as or with and perform some or all functions of the input power supply 110, the first power converter 120, the second power converter 130 of the vehicle steering electronic control sensor apparatus 100, the power supply 210 of the steering apparatus 200, and the power supply apparatus 300. The motor position sensor unit 412 may have the same or similar components as or with and perform some or all functions of the sensor module 140 of the vehicle steering electronic control sensor apparatus 100 and the motor position sensor or the motor angle sensor 220 of the steering apparatus 200. The control unit 413 may comprise the same or similar components as or with and perform all functions of the controller 230 of the steering apparatus 200.

Hereinafter, for simplicity of description, only brief functions will be described, and FIGS. 1 to 6 may be referred to for a specific function.

The steering apparatus 400 for a vehicle according to the present embodiment may control the operation of the steering motor 420 through or by at least one steering control module 410.

The steering control module 410 may include a power supply unit 411, a motor position sensor unit 412, and a control unit or controller 413. The power supply unit 411 may be configured to convert an input voltage to a first voltage, convert the first voltage to the plurality of sub-voltages through the plurality of sub-power converters, and supply the sub-voltages. The motor position sensor unit 412 may include at least two motor position sensors or at least two motor angle sensors operated by receiving the respective sub-voltages. The control unit 413 may be configured to generate or calculate assist steering force based on respective motor position sensor signals or respective motor angle sensor signals received from the motor position sensors or the motor angle sensors and control the operation of the steering motor 420 based on the calculated assist steering force.

The power supply unit 411 may include a first power converter configured to convert the input voltage into the first voltage, a first sub-power converter configured to convert the first voltage into a first sub-voltage, and a second sub-power converter configured to convert the first voltage into a second sub-voltage. The motor position sensors or the motor angle sensors may include a first motor position sensor or a first motor angle sensor and a second motor position sensor or a second motor angle sensor. The first motor position/angle sensor may be configured to receive the first sub-voltage to measure a position (e.g. an angle) of the steering motor 420 and to generate a first motor position sensor signal or a first motor angle sensor signal. The second motor position sensor or a second motor angle sensor may be configured to receive the second sub-voltage to measure the position of the steering motor 420 and to generate a second motor position sensor signal or a second motor angle sensor signal.

For example, the first sub-power converter may convert the first voltage into a first sub-voltage through a sub-regulator. The second sub-power converter may convert the first voltage into the second sub-voltage through at least one resistor.

The first motor position sensor and the second motor position sensor, or the first motor angle sensor and the second motor angle sensor may be included in a dual die.

The power supply unit 411 may further include a third sub-power converter. The third sub-power converter may be configured to convert the first voltage into a third sub-voltage. The motor position sensors or the motor angle sensors may include a third motor position sensor or a third motor angle sensor. The third motor position/angle sensor may be configured to receive the third sub-voltage to measure the position of the steering motor 420 and to generate a third motor position sensor signal or a third motor angle sensor signal.

For example, the third sub-power converter 137-1 may convert the first voltage into the third sub-voltage through a sub-regulator.

In this case, the third motor position sensor or the third motor angle sensor may be included in a single die.

Here, the control unit 413 may perform validity verification on each of motor position sensor signals or motor angle sensor signals, received from the at motor position sensors or the motor angle sensors, and may generate or calculate assist steering force according to verification results.

In another exemplary embodiment shown in FIG. 8, the steering control module 410 may be provided in plural while FIG. 7 illustrate a single steering control module 410. For example, the steering apparatus 400 may comprise at least two steering control modules, i.e., a first steering control module 410-1 and a second steering control module 410-2.

The first steering control module 410-1 may include a first power supply unit 411-1, a first motor position sensor unit 412-1, a first control unit 413-1, and the like. The second steering control module 410-2 may include a second power supply unit 411-2, a second motor position sensor unit 412-2, a second control unit 413-2, and the like.

The first steering control module 410-1 and the second steering control module 410-2 may be redundant so as to be equal to each other. That is, the first steering control module 410-1 and the second steering control module 410-2 may include the same elements.

Hereinafter, for simplicity of description, only a brief function will be described, and FIGS. 1 to 7 may be referred to for a specific function.

The first steering control module 410-1 and the second steering control module 410-2 of FIG. 8 may be the same or similar module as or with the steering control module 410 of FIG. 7. When the first steering control module 410-1 and the second steering control module 410-2 are in a normal state, the first steering control module 410-1 may generate or calculate assist steering force based on respective motor position sensor signals or respective motor angle sensor signals of the first motor position sensor unit 412-1 and may control the operation of the steering motor 420. When the first motor position sensor unit 412-1 included in the first steering control module 410-1 enters or becomes an abnormal state due to the first power supply unit 411-1 included in the first steering control module 410-1, the second steering control module 410-2 may generate or calculate assist steering force based on respective motor position sensor signals or respective motor angle sensor signals of the second motor position sensor unit 412-2 and may control the operation of the steering motor 420 based on the calculated assist steering force.

Here, the steering motor 420 may include a single winding type steering motor, although it is not required.

Meanwhile, the steering control modules of the steering apparatus 400 may include the first steering control module 410-1 and the second steering control module 410-2. When the first steering control module 410-1 and the second steering control module 410-2 are in a normal state, the first steering control module 410-1 may generate or calculate assist steering force based on respective motor position sensor signals or respective motor angle sensor signals of the first motor position sensor unit 412-1, and the second steering control module 410-2 may generate or calculate assist steering force based on respective motor position sensor signals or respective motor angle sensor signals of the second motor position sensor unit 412-2. Thus, the first steering control module 410-1 and the second steering control module 410-2 may control the operation of the steering motor 420 based on the calculated assist steering forces generated therefrom. When the first motor position sensor unit 412-1 included in the first steering control module 410-1 enters or becomes an abnormal state due to the first power supply unit 411-1 included in the first steering control module 410-1, the first steering control module 410-1 may receive the plurality of sub-voltages from the second power supply unit 411-2 included in the second steering control module 410-2, may operate the first motor position sensor unit 412-1 based on the received sub-voltages, and may generate or calculate assist steering force based on respective motor position sensor signals or respective motor angle sensor signals of the first motor position sensor unit 412-1, and the second steering control module 410-2 may generate or calculate assist steering force based on respective motor position sensor signals or respective motor angle sensor signals of the second motor position sensor unit 412-2. Thus, the first steering control module 410-1 and the second steering control module 410-2 may control the operation of the steering motor 420 based on the assist steering forces generated therefrom.

Here, the steering motor 420 may include a dual winding type steering motor.

The steering control module 410 may include an inverter, a gate driver, and the like.

Figure 9:
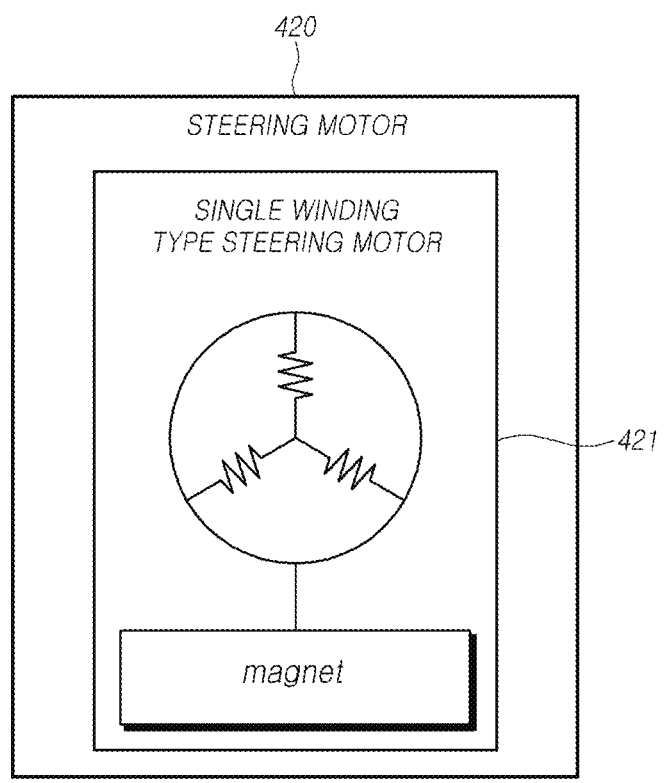
FIGS. 9 and 10 show detailed diagrams illustrating a steering motor according to embodiments of the present disclosure.
Figure 10:
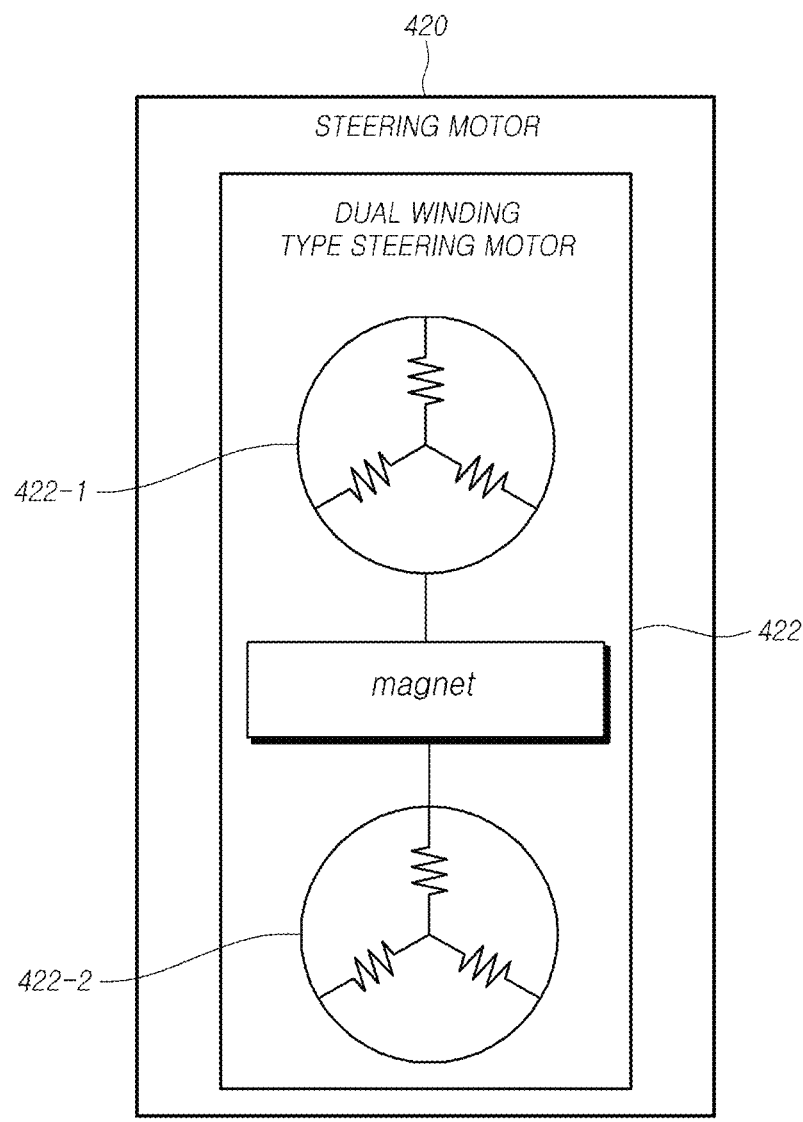

FIGS. 9 and 10 are detailed diagrams illustrating a steering motor according to embodiments of the present disclosure.

Referring to FIG. 9, the steering motor 420 may be the same element as the steering motor 240 described with reference to FIG. 5.

The steering motor 420 may include a single winding type steering motor 421. For example, the steering motor 420 may include a three-phase single winding type steering motor, although it is not required. The steering motor 420 may include any motor (for example, a single-phase, two-phase, four-phase, five-phase, or six-phase or more motor) that can supply steering force. The steering motor 420 may include a magnet. The magnet of the steering motor 420 may include or be, for example, but not limited to, a circular magnet. A shape of the magnet may be modified to be embodied.

The first steering control module 410-1 of FIG. 8 may control the single winding type steering motor 421. The second steering control module 410-2 of FIG. 8 may monitor an operation state of the first steering control module 410-1 of FIG. 8 currently controlling the current single winding type steering motor 421 through an internal communication network. As the monitoring result, when the operation state of the first steering control module 410-1 of FIG. 8 is abnormal, the second steering control module 410-2 of FIG. 8 may control the single winding type steering motor 421 instead of the first steering control module 410-1 of FIG. 8.

Referring to FIG. 10, the steering motor 420 may include a dual winding type steering motor 422. For example, the steering motor 420 may include a three-phase dual winding type steering motor, although it is not required. The steering motor 420 may include any motor (for example, a single-phase, two-phase, four-phase, five-phase, or six-phase or more motor) that can provide steering force. The steering motor 420 may include a magnet. The magnet of the steering motor 420 may include, for example, but not limited to, a circular magnet. A shape of the magnet may be modified and embodied For instance, the dual winding type steering motor 422 may include at least one phase (for example, three phases, five phases, six phases, or the like) in each of two windings.

The dual winding type steering motor 422 may include a first winding 422-1 and a second winding 422-2. The first winding 422-1 may be connected to the first steering control module 410-1 of FIG. 8 so that operation of the first winding 422-1 may be controlled by the first steering control module 410-1 of FIG. 8. The second winding 422-2 may be connected to the second steering control module 410-2 of FIG. 8 so that operation of the second steering control module 410-2 may be controlled by the second steering control module 410-2 of FIG. 8.

Specifically, the first steering control module 410-1 of FIG. 8 and the second steering control module 410-2 of FIG. 8 may be connected to two windings of the dual winding type steering motor 422, respectively. When the operation states of the first steering control module 410-1 and the second steering control module 410-2 are normal, a first assist current may be supplied to the first winding 422-1 of the dual winding type steering motor 422 through the first steering control module 410-1 of FIG. 8, and a second assist current may be supplied to the second winding 422-2 of the dual winding type steering motor 422 through the second steering control module 410-2 of FIG. 8. Accordingly, the first steering control module 410-1 and the second steering control module 410-2 of FIG. 8 may control the dual winding type steering motor 422 together. For example, when the output of the dual winding type steering motor 422 is 100%, each of the first steering control module 410-1 and the second steering control module 410-2 of FIG. 8 may supply 50% of an assist current to the dual winding type steering motor 422, respectively.

When the operation state of the first steering control module 410-1 of FIG. 8 is abnormal and the operation state of the second steering control module 410-2 of FIG. 8 is normal, the second steering control module 410-2 of FIG. 8 may supply the second assist current to the second winding 422-2 of the dual winding type steering motor 422. Accordingly, only the second steering control module 410-2 of FIG. 8 may control the dual winding type steering motor 422.

In the steering apparatus 400 for the vehicle, when the first motor position sensor unit 412-1 included in the first steering control module 410-1 enters or becomes an abnormal state due to the first power supply unit 411-1 included in the first steering control module 410-1, the first steering control module 410-1 may receive the sub-voltages from the second power supply unit 411-2 included in the second steering control module 410-2, may operate the first motor position sensor unit 412-1 based on the received sub-voltages, and may generate assist steering force based on motor position sensor signals or motor angle sensor signals of the first motor position sensor unit 412-1.

According to various exemplary embodiment, a steering apparatus for a vehicle may include a steering column module connected to a steering wheel and a steering rack module connected to a vehicle wheel. The steering column module and the steering rack module may be electrically interworked with each other. For example, the steering column module and the steering rack module can be electrically interworked through a steering control module.

Figure 11:
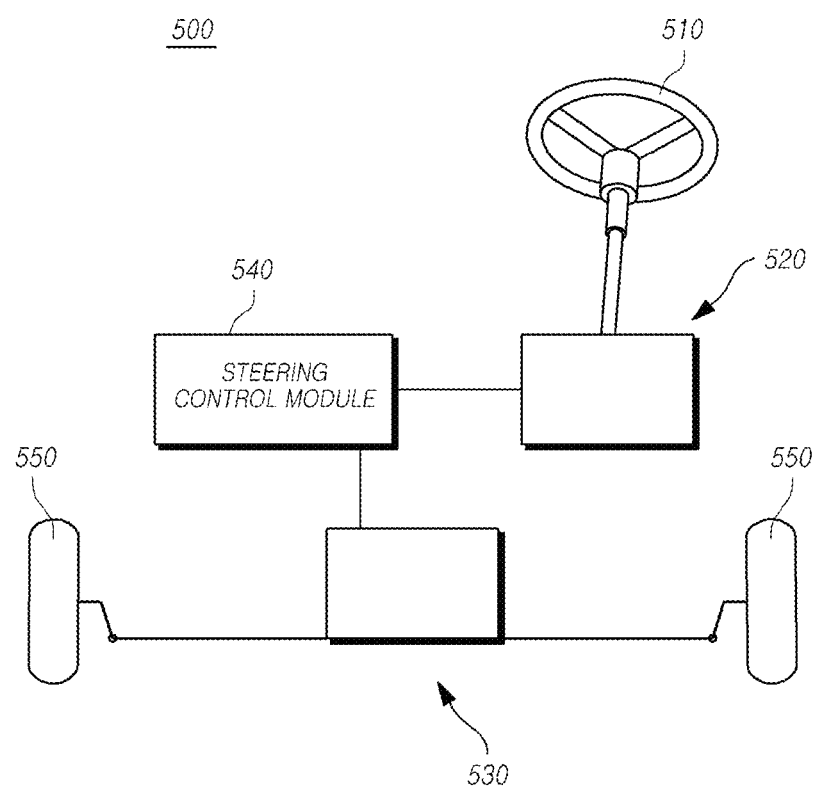
FIGS. 11 and 12 show overall block diagrams illustrating a steer-by-wire-based steering apparatus for a vehicle according to embodiments of the present disclosure.
Figure 12:
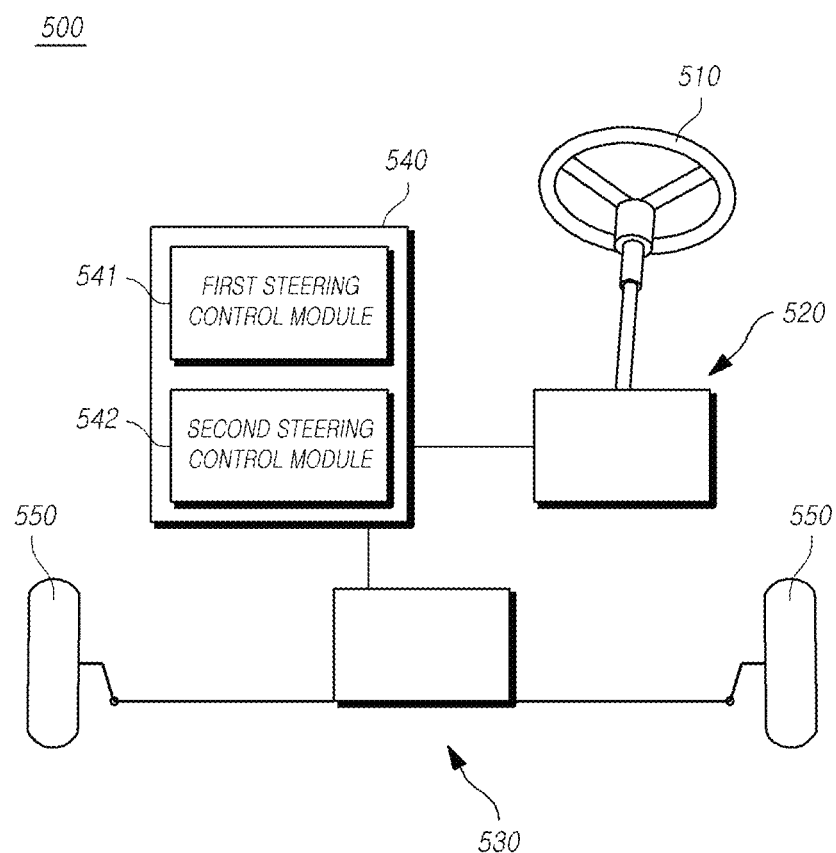

FIGS. 11 and 12 show overall block diagrams of a steer-by-wire-based steering apparatus for a vehicle according to embodiments of the present disclosure.

Referring to FIG. 11, a steer-by-wire-based steering apparatus 500 for a vehicle may generally include a steering wheel 510, a steering column module (SCM) 520, a steering rack module (SRM) 530, a steering control module 540, at least one vehicle wheel 550, and the like.

The steering wheel 510 may be operated (i.e., rotated) by the operation of a driver. For example, the steering wheel 510 may be rotated by the operation of the driver, and a moving direction of a vehicle (that is, a moving or rotating direction of the vehicle wheel 550 or the like) may be determined or changed based on the rotation of the steering wheel 510.

The SCM 520 may be connected to the steering wheel 510. The SCM 520 may include, for example, but not limited to, one or more of a steering shaft, a steering reaction force motor, and various sensors, and the like.

The steering shaft may be connected to the steering wheel 510. When the steering wheel 510 is rotated, the steering shaft may be rotated corresponding to the rotation of the steering wheel 510.

The steering reaction force motor may be connected to the steering shaft. The steering reaction force motor may rotate in a direction opposite to the rotation direction of the steering wheel 510 to supply steering reaction force to the steering wheel 510. The steering reaction force motor may allow the driver to feel a suitable steering sensation or feeling.

The steering reaction force motor may be directly connected to the steering shaft, although it is not required. For instance, the steering reaction force motor may be connected to the steering shaft through a gear (or a speed reducer). The gear (or the speed reducer) may be, for example, but not limited to, a worm wheel type. The gear (or the speed reducer) may include any type that can connect the steering reaction force motor to the steering shaft.

The sensors may measure states of various elements included in the SCM 520. The sensors may include, for example, but not limited to, at least one of a motor position sensor, a motor angle sensor, a steering angle sensor, a steering torque sensor, and a steering angular speed sensor. The sensors may include any sensor that can measure a state of at least one of the elements included in the SCM 520.

For example, the motor position sensor or the motor angle sensor may measure a position of the steering reaction force motor. The steering angle sensor may measure a rotation angle of the steering wheel 510, i.e., a steering angle of the steering wheel 510. The steering torque sensor may measure steering torque generated on the steering shaft as the steering wheel 510 rotates. The steering angular speed sensor may measure a rotating angular speed of the steering wheel 510, i.e., a steering angular speed of the steering wheel 510.

The SRM 530 may be mechanically separated from the SCM 520. The SCM 520 may include, for example, but not limited to, one or more of a driving motor, a pinion, a rack, various sensors, and the like.

The driving motor may be driven by a driving current. The driving motor may generate driving torque corresponding to the driving current to supply steering force to at least one vehicle wheel 550.

The pinion may be connected to the driving motor. The pinion may perform rotational motion in response to the driving torque generated by the driving motor. The rack may be connected to the pinion. The rack may perform linear motion corresponding to the rotational motion of the pinion. As described above, the pinion and the rack may change the direction of or rotate at least one vehicle wheel 550 by supplying steering force to at least one vehicle wheel 550 by using the driving torque of the driving motor described above.

The sensors may measure the states of various elements included in the SRM 530. The sensors may include, for example, but not limited to, at least one sensor of a motor position sensor, a motor angle sensor, a rack position sensor, a rack displacement sensor, a pinion angle sensor, and a pinion angular speed sensor. The sensors may include any sensor that can measure a state of at least one of the elements included in the SRM 530.

For example, the motor position sensor or the motor angle sensor may measure a position of the driving motor. The rack position sensor may measure a position of the rack. The rack displacement sensor may measure displacement of the rack. The pinion angle sensor may measure an angle of the pinion, i.e., a rotation angle of the pinion. The pinion angular speed sensor may measure an angular speed of the pinion, i.e., a rotating angular speed of the pinion.

The steering control module 540 may be connected to the SCM 520 and the SRM 530. The steering control module 540 may control operations of the SCM 520 and the SRM 530, i.e., operations of elements included in the SCM 520 and the SRM 530.

That is, the steering control module 540 may receive information from respective elements included in the SCM 520 and the SRM 530, may generate control signals by using the received information, and may control operations of the respective elements included in the SCM 520 and the SRM 530 based on the generated control signals.

The steering control module 540 may be connected to sensors disposed in a vehicle. The steering control module 540 may control operations of the respective sensors disposed in the vehicle. That is, the steering control module 540 may control the operations the respective sensors disposed in the vehicle and may receive sensor or sensed information (for example, vehicle information of a vehicle or the like) from the sensors. The steering control module 540 may generate respective control signals based on the received sensor information and may control the operations of the elements included in each of the SCM 520 and the SRM 530 by using the generated respective control signals.

At least one vehicle wheel 550 may be connected to the SRM 530. The vehicle wheel 550 may be connected to the rack. For instance, the vehicle wheel 550 may be connected to the rack through a tie rod and a knuckle arm. Thus, the linear movement of the rack may be transferred to the vehicle wheel 550 through the tie rod and the knuckle arm.

Hereinafter, for simplicity of description, only a brief function will be described, and FIGS. 1 to 10 may be referred to for a specific function.

The steering apparatus for the vehicle according to the present embodiment may be a steer-by-wire-based steering apparatus 500, which controls operation of at least one of a steering reaction force motor and a driving motor through at least one steering control module.

For instance, the steering apparatus for the vehicle according to the present embodiment may be a steer-by-wire-based steering apparatus 500, which controls operation of a steering reaction force motor through at least one steering control module.

At least one steering control module 540 may include a power supply unit configured to convert an input voltage into a first voltage, convert the first voltage into the plurality of sub-voltages through the plurality of sub-power converters, and supply the sub-voltages; a motor position sensor unit including at least two motor position sensors and/or at least two motor angle sensors operated by receiving the sub-voltages; and a controller unit or controller configured to generate assist steering force (for example, steering reaction force) based on motor position sensor signals or motor angle sensor signals received from the motor position sensors or motor angle sensors and to control the operation of the steering reaction force motor based on the assist steering force (for example, the steering reaction force).

Here, since the steering control module 540 is the same element as the steering control module 410 described with reference to FIG. 7, the description with reference to FIG. 7 may be applied to the steering control module 540.

In addition, the steering apparatus for the vehicle according to the present embodiment may be a steer-by-wire-based steering apparatus 500, which controls the operation of a driving motor through at least one steering control module.

At least one steering control module 540 may include a power supply unit configured to convert an input voltage into a first voltage, convert the first voltage into sub-voltages through at least two sub-power converters, and supply the sub-voltages; a motor position sensor unit including at least two motor position sensors and/or at least two motor angle sensors operated by receiving the sub-voltages; and a controller unit or controller configured to generate assist steering force (for example, a driving current) based on motor position sensor signals or motor angle sensor signals received from the motor position sensors or the motor angle sensors and to control the operation of the steering reaction force motor based on the assist steering force (for example, the driving current).

Here, since the steering control module 540 is the same element as the steering control module 410 described with reference to FIG. 7, the description with reference to FIG. 7 may be applied to the steering control module 540.

Some elements of the steering control module 540, which control the steering reaction force motor and the driving motor, may be separated from each other.

Elements included in the steering control module 540, which control the steering reaction force motor and the driving motor, have been described by using the same reference numeral for convenience of description. However, as described above, some elements of the steering control module 540, which control the steering reaction force motor and the driving motor, may be separated from each other.

Referring to FIG. 12, a steering apparatus for a vehicle according to the present embodiment may be a steer-by-wire-based steering apparatus 500 which controls the operation of a steering reaction force motor through two steering control modules or controllers.

At least one steering control module 540 may include a first steering control module 541 and a second steering control module 542. When the first steering control module 541 and the second steering control module 542 are in a normal state, the first steering control module 541 may generate assist steering force (for example, steering reaction force) based on motor position sensor signals or motor angle sensor signals of a first motor position sensor unit and may control the operation of the steering reaction force motor based on the assist steering force. When the first motor position sensor unit included in the first steering control module 541 enters or becomes an abnormal state due to a first power supply unit included in the first steering control module 541, the second steering control module 542 may generate assist steering force (for example, steering reaction force) based on motor position sensor signals or motor angle sensor signals of a second motor position sensor unit and may control the operation of the steering reaction force motor based on the assist steering force.

In addition, the steering apparatus for the vehicle according to the present embodiment may be a steer-by-wire-based steering apparatus 500, which controls the operation of a driving motor through two steering control modules.

At least one steering control module 540 may include a first steering control module 541 and a second steering control module 542. When the first steering control module 541 and the second steering control module 542 are in a normal state, the first steering control module 541 may generate assist steering force (for example, a driving current) based on motor position sensor signals or motor angle sensor signals of a first motor position sensor unit and may control the operation of a driving motor based on the assist steering force. When the first motor position sensor unit included in the first steering control module 541 enters or becomes an abnormal state due to a first power supply unit included in the first steering control module 541, the second steering control module 542 may generate assist steering force (for example, a driving current) based on motor position sensor signals or motor angle sensor signals of a second motor position sensor unit and may control the operation of the driving motor based on the assist steering force.

Here, since the steering control module 540 is the same element as the steering control module 410 described with reference to FIG. 8, the description with reference to FIG. 8 may be applied to the steering control module 540.

For example, the steering motor may include a single winding type steering motor.

Some elements of the above-described steering control module, which control the steering reaction force motor and the driving motor, may be separated from each other.

Elements included in the steering control module, which control the steering reaction force motor and the driving motor, have been described by using the same reference numeral for convenience of description. However, as described above, some elements of the steering control module, which control the steering reaction force motor and the driving motor, may be separated from each other.

The steering apparatus for the vehicle according to the present embodiment may be a steer-by-wire-based steering apparatus, which controls the operation of a steering reaction force motor through two steering control modules.

At least one steering control module 540 may include a first steering control module 541 and a second steering control module 542. When the first steering control module 541 and the second steering control module 542 are in a normal state, the first steering control module 541 may generate assist steering force (for example, steering reaction force) based on motor position sensor signals or motor angle sensor signals of a first motor position sensor unit, and the second steering control module 542 may generate assist steering force (for example, steering reaction force) based on each motor position sensor signal or each motor angle sensor signal of a second motor position sensor unit. Thus, the first steering control module 541 and the second steering control module 542 may control the operation of a steering motor based on the assist steering force (for example, the steering reaction force) generated therefrom. When the first motor position sensor unit included in the first steering control module 541 enters or becomes an abnormal state due to a first power supply unit included in the first steering control module 541, the first steering control module 541 may receive sub-voltages from a second power supply unit included in the second steering control module 542, may operate the first motor position sensor unit based on the received sub-voltages, and may generate assist steering force (for example, steering reaction force) based on motor position sensor signals or motor angle sensor signals of the first motor position sensor unit, and the second steering control module 542 may generate assist steering force (for example, steering reaction force) based on motor position sensor signals or motor angle sensor signals of a second motor position sensor unit. Thus, the first steering control module 541 and the second steering control module 542 may control the operation of the steering motor based on the assist steering force (for example, the steering reaction force) generated therefrom.

In addition, the steering apparatus for the vehicle according to the present embodiment may be a steer-by-wire-based steering apparatus for a vehicle, which controls operation of a driving motor through two steering control modules.

At least one steering control module 540 may include a first steering control module 541 and a second steering control module 542. When the first steering control module 541 and the second steering control module 542 are in a normal state, the first steering control module 541 may generate assist steering force (for example, a driving current) based on motor position sensor signals or motor angle sensor signals of a first motor position sensor unit, and the second steering control module 542 may generate assist steering force (for example, a driving current) based on motor position sensor signals or motor angle sensor signals of a second motor position sensor unit. Thus, the first steering control module 541 and the second steering control module 542 may control the operation of a driving motor based on the assist steering force (for example, the driving currents) formed therefrom. When the first motor position sensor unit included in the first steering control module 541 enters or becomes an abnormal state due to a first power supply unit included in the first steering control module 541, the first steering control module 541 may receive sub-voltages from a second power supply unit included in the second steering control module 542, may operate the first motor position sensor unit based on the received sub-voltages, and may generate assist seering force (for example, a driving current) based on motor position sensor signals or motor angle sensor signals of the first motor position sensor unit, and the second steering control module 542 may generate assist seering force (for example, a driving current) based on motor position sensor signals or motor angle sensor signals of the second motor position sensor unit. Thus, the first steering control module 541 and the second steering control module 542 may control the operation of the driving motor based on the assist steering force (for example, the driving currents) formed therefrom.

Here, since the steering control module 540 is the same element as the steering control module 410 described with reference to FIG. 8, the description with reference to FIG. 8 may be applied to the steering control module 540.

Here, the steering motor may include a dual winding type steering motor.

Some elements of the above-described steering control module, which control the steering reaction force motor and the driving motor, may be separated from each other.

Elements included in the steering control module which control the steering reaction force motor and the driving motor have been described by using the same reference numerals for convenience of description. However, as described above, some elements of the steering control module which control the steering reaction force motor and the driving motor may be separated from each other.

The steering control module 540 may include, for example, but not limited to, an inverter, a gate driver, and the like.

Figure 13:
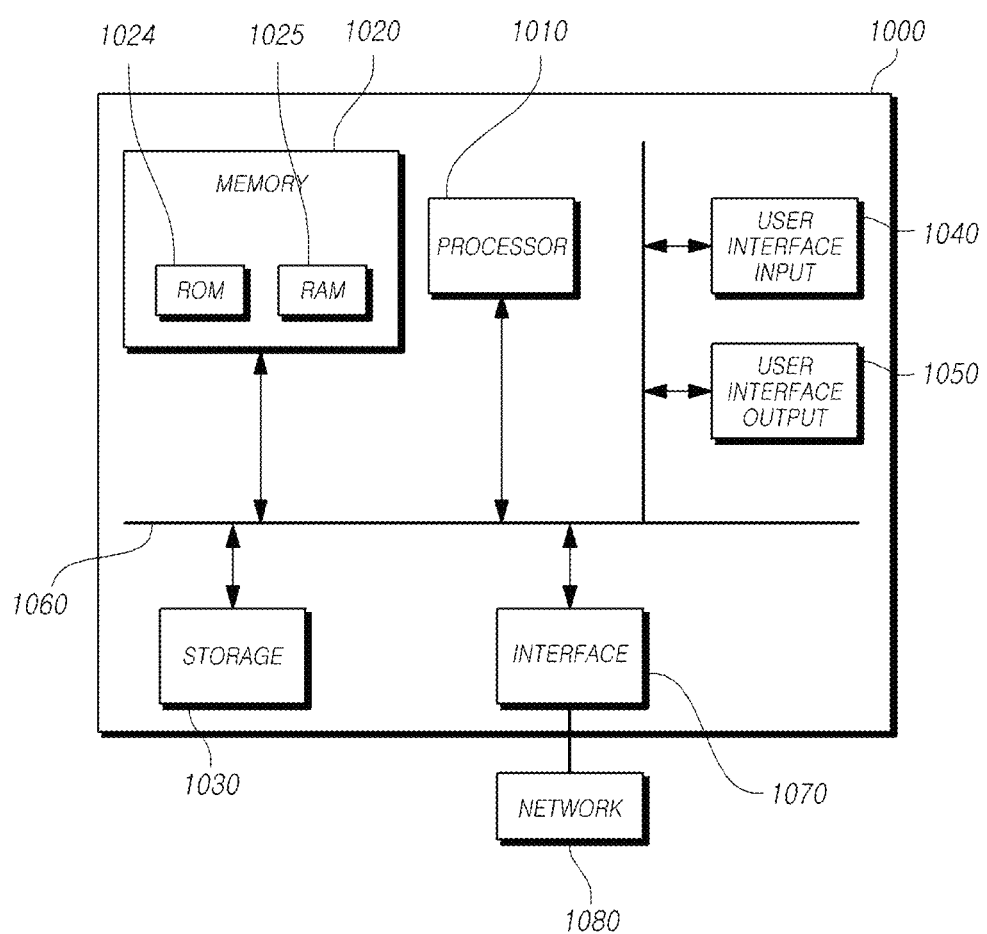
FIG. 13 shows a block diagram of a computer system for a vehicle steering electronic control sensor apparatus, a power supply apparatus, and a steering apparatus for a vehicle according to embodiments of the present disclosure.

FIG. 13 shows a block diagram of a vehicle steering electronic control sensor apparatus, a power supply apparatus, and a steering apparatus for a vehicle according to embodiments of the present disclosure.

Referring to FIG. 13, some elements, units and modules of the above-described embodiments of the present disclosure may be implemented in a computer system, for example, as a non-transitory computer-readable recording medium. For example, the vehicle steering electronic control sensor apparatus 100, the power supply apparatus 300, the steering apparatus 200, and the like may include a computer system 1000 comprising at least one of at least one processor 1010, a memory 1020, a storage 1030, a user interface input 1040, and a user interface output 1050, which may communicate with each other through a bus 1060. In addition, the computer system 1000 may also include a network interface 1070 for connecting to a network 1080. The processor 1010 may be, for example, but not limited to, a central processing unit (CPU) or a semiconductor device which executes one or more process commands stored in the memory 1020 and/or the storage 1030. The memory 1020 and the storage 1030 may include various types of volatile/nonvolatile storage media. For example, the memory may include a read-only memory (ROM) 1021 and a random-access memory (RAM) 1023.

Accordingly, certion embodiments of the present disclosure may be implemented by a method implemented with a computer or by a non-volatile computer recording medium in which computer executable commands are stored. The commands may be executed by at least one embodiment of the present disclosure when they are executed by the processor.

As described above, according to certain embodiments of a vehicle steering electronic control sensor apparatus, a power supply apparatus, and a steering apparatus for a vehicle, the power supplied to at least two sensors can be separated, thereby improving redundancy and reliability of the power supplied to the sensors.

In addition, according to some embodiments of the present disclosure, a voltage supplied to a main regulator can be supplied to a motor position sensor or a motor angle sensor through a passive component or element, thereby reducing manufacturing costs of a vehicle steering electronic control sensor apparatus as well as manufacturing costs of a steering apparatus for a vehicle.

Furthermore, according to certain embodiments of the present disclosure, a motor position sensor or a motor angle sensor can be operated using power voltages which are supplied separately, thereby improving redundancy and reliability of a vehicle steering electronic control sensor apparatus and a steering apparatus for a vehicle.

In addition, according to some embodiments of the present disclosure, the power supplied to the plurality of motor position sensors or motor angle sensors can be separated, thereby improving redundancy and reliability of a steering apparatus for a vehicle.

While the vehicle steering electronic control sensor apparatus, the power supply apparatus, the steering apparatus for a vehicle according to exemplary embodiments of the present disclosure have been described, it is to be understood that those embodiments are not limited to the disclosed embodiments, but, on the contrary, are intended to cover various modifications and equivalent arrangements included within the spirit and scope of the appended claims.

What is claimed is:

1. A steering apparatus for controlling a steering motor, the apparatus comprising at least one steering control module, wherein the at least one steering control module comprises:
   a power converter configured to convert an input voltage into a first voltage;
   a plurality of sub-power converters configured to convert the first voltage into a plurality of sub-voltages;
   a plurality of motor position sensors receiving the sub-voltages and generating signals associated with a motor position, each of the motor position sensors receiving at least one corresponding sub-voltage of the sub-voltages; and
   a controller configured to calculate assist steering force of a steering motor based on the signals associated with the motor position and configured to control the steering motor based on the assist steering force,
   wherein:
   the at least one steering control module includes a first steering control module and a second steering control module,
   the first steering control module comprises a plurality of first motor position sensors and the second steering control module comprises a plurality of second motor position sensors,
   when the first steering control module and the second steering control module are in a normal state, the first steering control module calculates assist steering force based on first motor position sensor signals of the first motor position sensors and controls the steering motor based on the assist steering force calculated based on the first motor position sensor signals, and
   when the first motor position sensors enter an abnormal state, the second steering control module calculates assist steering force based on second motor position sensor signals of the second motor position sensors and controls the steering motor based on the assist steering force calculated based on the second motor position sensor signals.

2. The steering apparatus of claim 1, wherein the sub-power converters include: a first sub-power converter configured to convert the first voltage into a first sub-voltage; and a second sub-power converter configured to convert the first voltage into a second sub-voltage, and
   wherein the motor position sensors include: a first motor position sensor configured to receive the first sub-voltage to measure a position of the steering motor and to generate a first motor position sensor signal; and a second motor position sensor configured to receive the second sub-voltage to measure the position of the steering motor and to generate a second motor position sensor signal.

3. The steering apparatus of claim 2, wherein the sub-power converters further include a third power converter configured to convert the first voltage into a third sub-voltage, and
   the motor position sensors further include a third motor position sensor configured to receive the third sub-voltage to measure the position of the steering motor and to generate a third motor position sensor signal.

4. The steering apparatus of claim 1, wherein the controller performs validity verification on the motor position sensor signals received from the motor position sensors and control the assist steering force according to the performed validity verification.

5. The steering apparatus of claim 1, wherein the steering motor includes a single winding steering motor.

6. The steering apparatus of claim 1, further including a steering column module connected to a steering wheel and a steering rack module connected to a vehicle wheel, and
   wherein the steering column module and the steering rack module are electrically connected with each other.

7. A steering apparatus for controlling a steering motor, the apparatus comprising at least one steering control module, wherein the at least one steering control module comprises:
- a power converter configured to convert an input voltage into a first voltage;
- a plurality of sub-power converters configured to convert the first voltage into a plurality of sub-voltages;
- a plurality of motor position sensors receiving the sub-voltages and generating signals associated with a motor position, each of the motor position sensors receiving at least one corresponding sub-voltage of the sub-voltages; and
- a controller configured to calculate assist steering force of a steering motor based on the signals associated with the motor position and configured to control the steering motor based on the assist steering force, wherein:
- the at least one steering control module includes a first steering control module and a second steering control module,
- the first steering control module comprises a plurality of first motor position sensors and the second steering control module comprises a plurality of second motor position sensors,
- when the first steering control module and the second steering control module are in a normal state, the first steering control module calculates assist steering force based on first motor position sensor signals of the first motor position sensors, the second steering control module calculates assist steering force based on second motor position sensor signals of the second motor position sensors, and the first and second steering control modules control the steering motor based on the assist steering force calculated by the first and second steering control modules, and
- when the first motor position sensors enter an abnormal state, the first steering control module receives sub-signals from the second steering control module, operates the first motor position sensors based on the sub-signals received from the second steering control module, and calculates assist steering force based on the first motor position sensor signals of the first motor position sensors, the second steering control module calculates assist steering force based on the second motor position sensor signals of the second motor position sensors, and the first steering control module and the second steering control module control the steering motor based on the assist steering force calculated by the first and second steering control modules.

8. The steering apparatus of claim 7, wherein the steering motor includes a dual winding steering motor.

* * * * *